United States Patent [19]

Bredow

[11] Patent Number: 4,483,523

[45] Date of Patent: Nov. 20, 1984

[54] ARRANGEMENT ON COORDINATE TABLE OF PROCESSING MACHINE FOR CARRIAGE DRIVE

[75] Inventor: Walter Bredow, Alfeld, Fed. Rep. of Germany

[73] Assignee: C. Behrens AG, Alfeld, Fed. Rep. of Germany

[21] Appl. No.: 424,954

[22] Filed: Sep. 27, 1982

[30] Foreign Application Priority Data

Oct. 1, 1981 [DE] Fed. Rep. of Germany ....... 3139031

[51] Int. Cl.³ .............................................. B23Q 3/18
[52] U.S. Cl. ........................................ 269/60; 269/73
[58] Field of Search ............................ 269/60, 73, 70; 74/89.15; 108/20, 21, 137, 143; 33/1 M, 174 TA; 248/424, 429, 430, 178, 179

[56] References Cited

U.S. PATENT DOCUMENTS

| | | | |
|---|---|---|---|
| 3,638,933 | 2/1972 | Burnette | 269/60 |
| 3,743,904 | 7/1973 | Wiesler et al. | 269/60 |
| 3,801,090 | 4/1974 | Gillen | 269/60 |

Primary Examiner—Robert C. Watson
Attorney, Agent, or Firm—Michael J. Striker

[57] ABSTRACT

An arrangement on a coordinate table of a processing machine for driving a carriage movable in an X-direction has a displacing device with a ball screw nut carried by a carriage and a ball screw cooperating with the ball screw nut and having two ends, two end supports each provided at the respective end of the ball screw and being stationary relative to the carriage, two additional supports provided for said ball screw and arranged on the carriage at opposite sides of the nut and movable relative to the carriage in direction of its movement, two stationary abutments each arranged at a respective one of the ends of the carriage and limiting a movement stroke of a respective one of the additional supports when the latter abut against the respective stationary abutment, two releasable abutment locks arranged so that each of the additional supports is arrested during abutment against a respective one of the stationary abutments and released during running against a respective one of the end supports because of the carriage movement, and two additional locks each arranged between each of the end supports and the respective one of the additional supports so that during reverse carriage movement a respective one of the additional supports is taken along until its new abutting and arresting.

9 Claims, 7 Drawing Figures

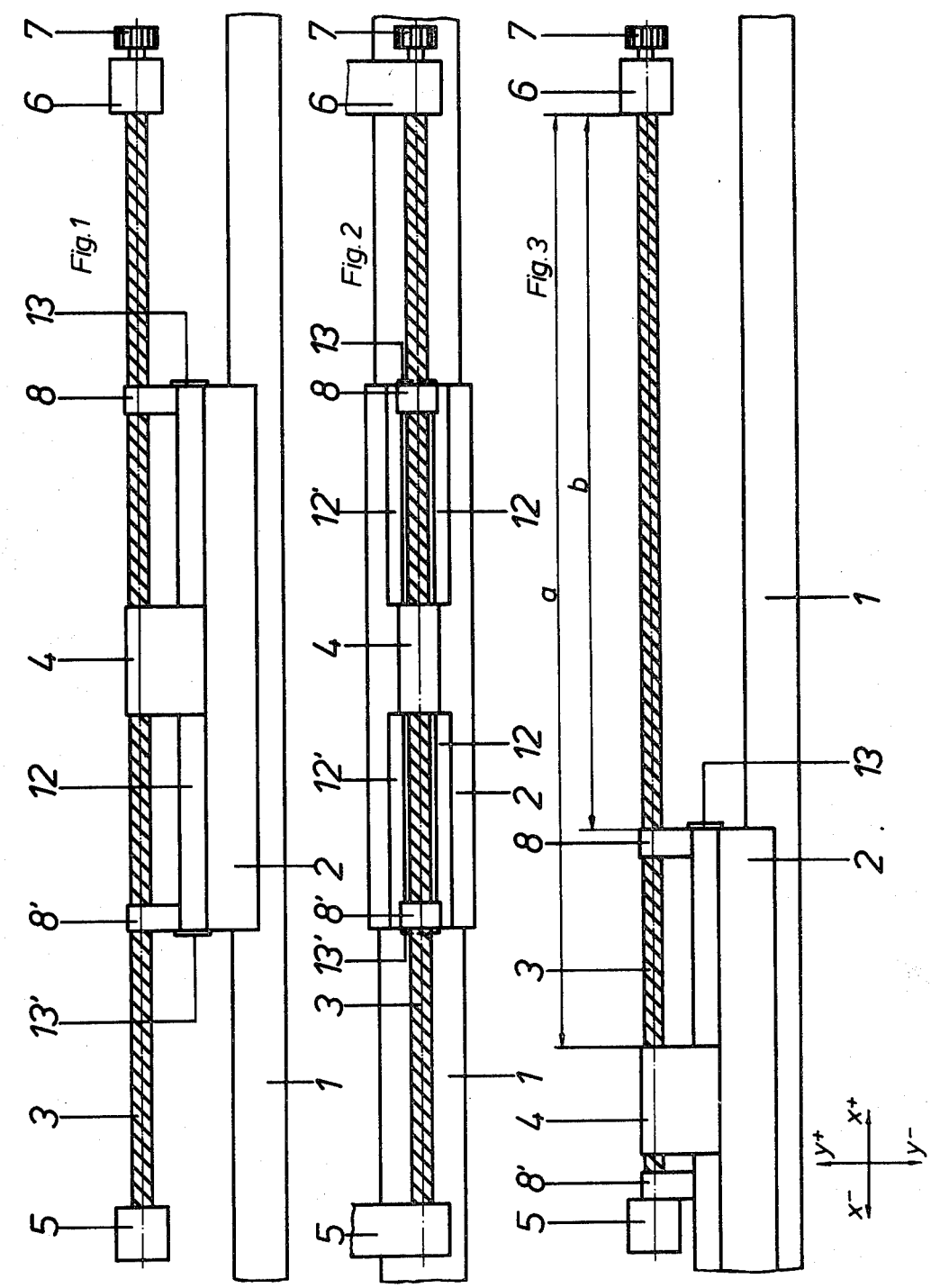

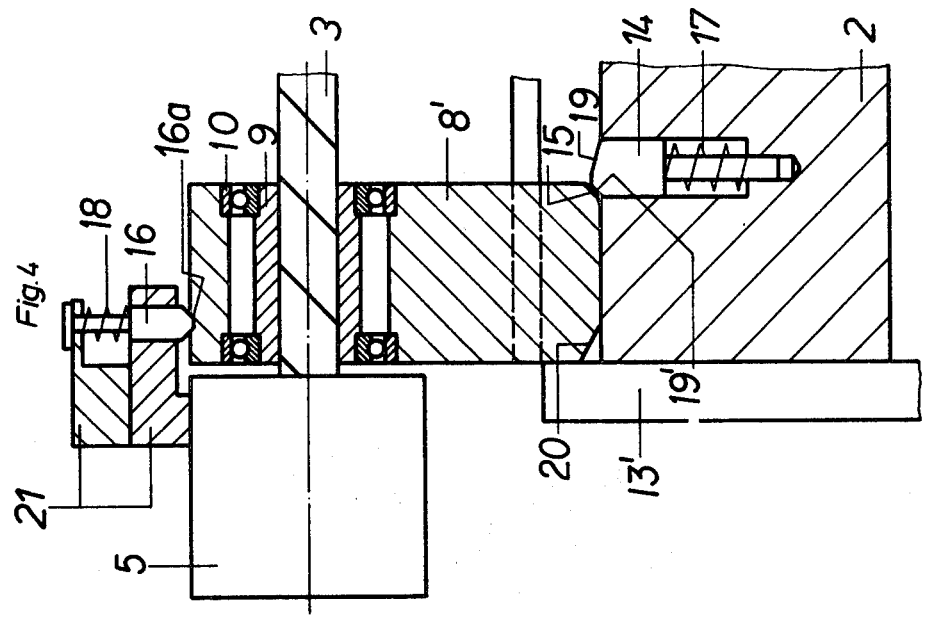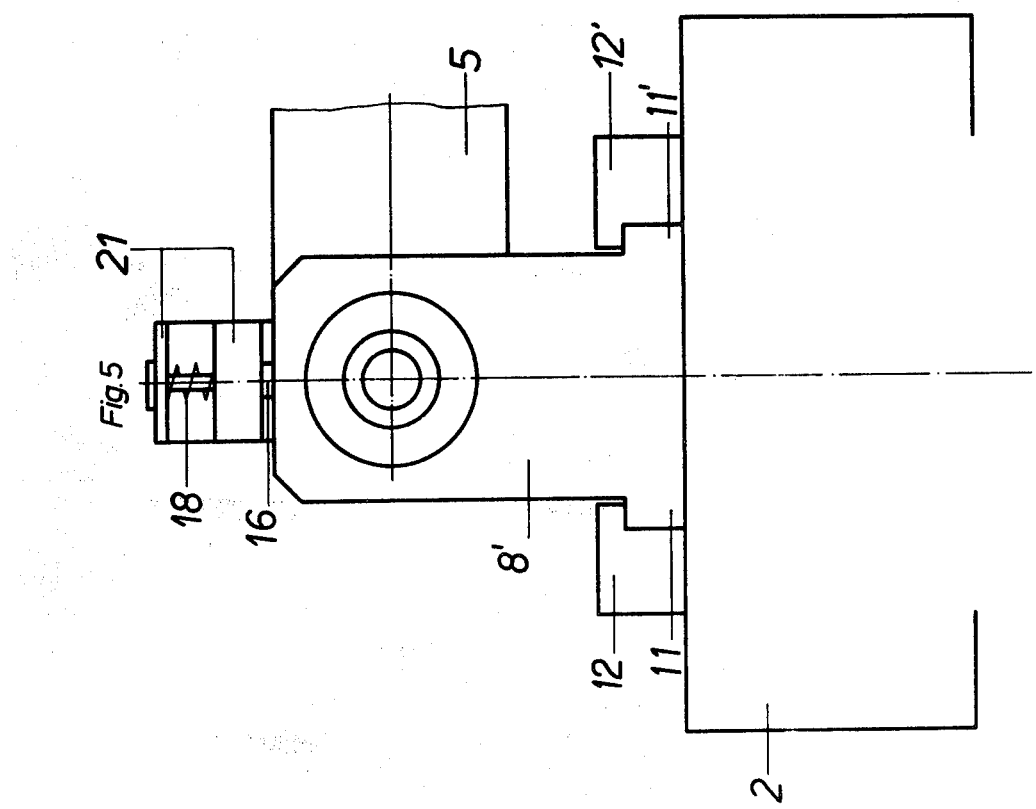

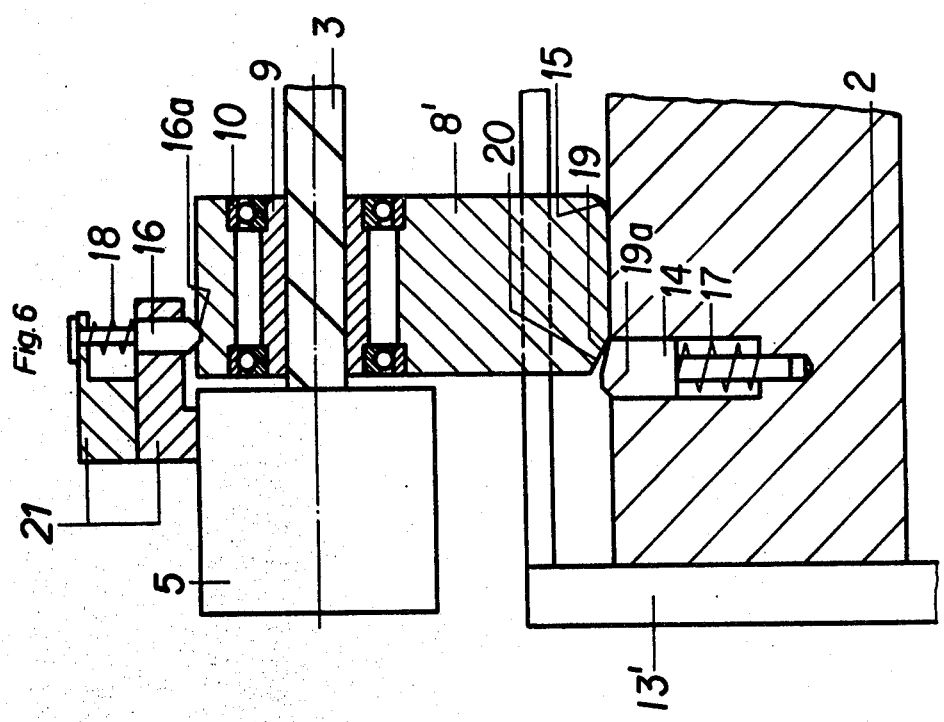

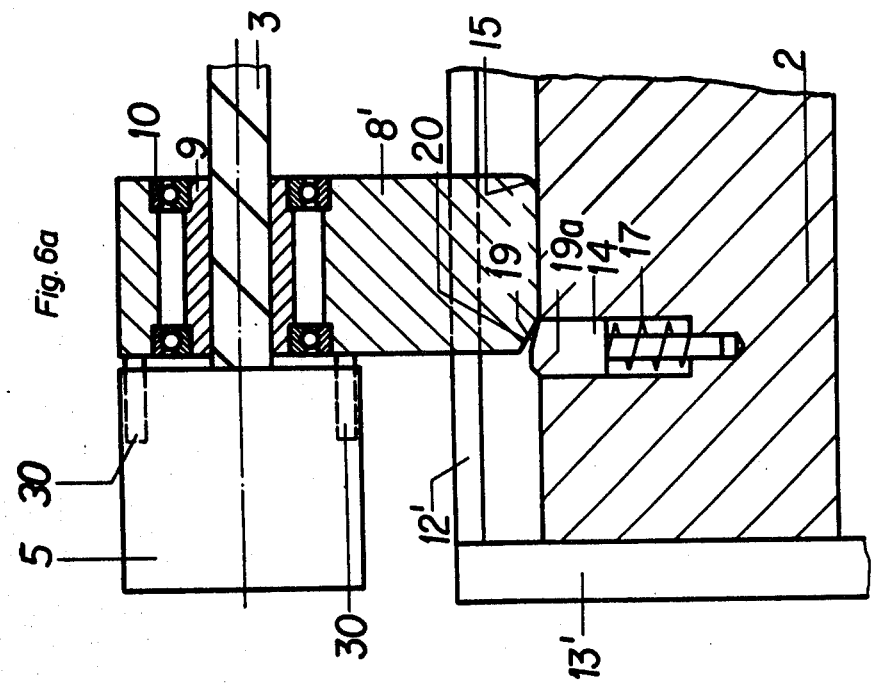

ARRANGEMENT ON COORDINATE TABLE OF PROCESSING MACHINE FOR CARRIAGE DRIVE

BACKGROUND OF THE INVENTION

The present invention relates to an arrangement on a coordinate table of a processing machine for driving a carriage movable in X-direction. More particularly, it relates to an arrangement which has a ball screw nut and a ball screw associated therewith, wherein the ball screw is supported at its ends with end supports stationary relative to the carriage.

Ball screw drives for driving in X-direction and in Y-direction are used particularly in numerically controlled coordinate tables of processing machines, particularly cutting presses. In the known coordinate tables provided with such ball screw drives, there are, however, difficulties for driving in X-direction, i.e., for driving the carriage in a direction to the tool, for the following reasons. The drive means for X-axis travel over the drive for the Y-axis in Y-direction. In numerically controlled coordinate tables, and particularly on cutting presses, the Y-axis is very often accelerated in the Y-direction and then again braked. This process can be repeated in several hundred times per minute. For stopping such movement processes in the shortest time, considerable accelerating and decelerating values are required. When the free length of the ball screw in the X-direction is particularly great, a considerable bending of the ball screw during the movement in the Y-direction takes place. Decisive for the value of this bending is the weight of the ball screw, its free length, or in other words the distance between two supports, one of which in such case is formed by a support of the nut of the ball screw drive, and the acceleration or deceleration which takes place. When the abutment of the ball screw provided for the X-direction occurs by the movement in Y-direction so fast one after the other and so that the flexure of the ball screw is not brought back to zero, a regular amplification of the vibrations of the ball screw takes place. As a result of this, the known drive arrangements for coordinate tables with great dimensions cannot be used, inasmuch as the vibrations of the ball screw which takes place exceed the acceptable value. However, for a long time there is a requirement to provide coordinate tables of great dimensions with ball screw drives, inasmuch as such ball screw drives are especially economical because the ball screws can be used both for force transmission and as a measuring system.

SUMMARY OF THE INVENTION

Accordingly, it is an object of the present invention to provide an arrangement on a coordinate table of a processing machine for driving a carriage in X-direction, which avoids the disadvantages of the prior art.

More particularly, it is an object of the present invention to provide an arrangement on a coordinate table of a processing machine for driving a carriage movable in X-direction, which provides for use of ball screws of a greater length, and thereby makes possible to provide coordinate tables of considerably greater dimensions with ball screw drives, without disadvantage vibration conditions, and particularly resonant rise, which conventionally take place in known ball screw drives.

In keeping with these objects, and with others which will become apparent hereinafter, one feature of the present invention resides, briefly stated, in an arrangement which is provided with additional supports for the ball screw located at both sides of the ball screw nut and displaceable relative to the carriage in its movement direction, the displacement stroke of the additional supports at the associated carriage end being limited by a fixed abutment, and the additional support during abutment against this fixed abutment on the carriage being arrested by a releasable abutment lock which during running of the additional support against the associated end support in the course of the carriage movement releases the additional support, and a releasable additional lock is arranged between each end support and the associated additional support, and during a return carriage movement takes along the additional support until its new abutting and arresting against the associated fixed abutment.

Because of the additional support provided on the carriage, it is attained that the ball screw is supported at a considerable distance from the ball screw nut additionally at both sides, so that the free length of the ball screw available for the vibrations is considerably reduced, and with consideration of acceptable free length the entire length of the ball screw can be considerably increased without disadvantages. Because of the displaceability of the additional support in connection with the respective arresting, it is attained that the carriage can travel over approximately the entire length of the ball screw. When the carriage travels in direction towards the end support, the additional support is released from its arresting on the fixed abutment of the carriage end and displaces to the vicinity of the ball screw nut, which can displace therewith approximately completely to the associated end support. This is true for both carriage ends, and thereby for both displacing directions of the carriage. When the movement of the carriage is reversed, the respective auxiliary support is carried along by the additional lock first from the respective end support until it attains the end position on the fixed abutment of the carriage end and thereby again supports the ball screw at maximum possible distance on the carriage. Thereby, in each position a considerable shortening of the free length of the ball screw susceptible to the vibration takes place. The thus designed ball screw drive can be used with coordinate tables with great dimensions without the above mentioned disadvantageous vibration conditions.

For particularly reliable functioning of the arrangement, and particularly the additional locks in cooperation with the abutment locks, it is advantageous and helpful when in accordance with another feature of the present invention each releasable additional lock of the associated additional support during running of the additional support on the end support arrests the end support and the additional support with one another, and the holding forces of the abutment lock and the associated additional lock are so determined relative to one another that the additional lock with the arrested abutment lock comes into engagement, the abutment lock however after running of the additional support against the end support with the arrested additional lock is released. Thereby, it is guaranteed that the abutment lock during movement of the carriage and thereby the additional support against the associated end support is overcome and the additional lock is arrested, and during further carriage movement in direction to the end support to the abutment lock the additional support is released and thereby it can be displaced in direction to the ball screw nut.

A particularly advantageous construction in accordance with still another feature of the present invention is obtained when each additional support is formed as a lunette displaceable with the carriage, is displaceably guided by guide projections at both sides of its foot in guide rails of the carriage. Thereby a simple construction provides for a reliable displaceability of the additional support.

A simple construction for the abutment lock with simple mounting on the carriage is obtained in accordance with a further feature of the invention when each abutment lock includes a locking catch projecting from the carriage surface and deflectable against spring action from the front or rear edge of the additional support. This locking catch is thereby automatically deflected in correspondence with the carriage movement from the additional support when the respective force takes place.

It is advantageous when the front and rear edges of the additional support are formed as inclined control edges which cooperate with respective ascending surfaces on the locking catch. It provides for reliable automatic deflection of the locking catch during movement of the additional support relative to the movable carriage.

A further advantageous construction for the additional lock and its arresting in cooperation with the abutment lock is obtained in accordance with a further feature of the present invention when each additional lock is formed as a further locking catch carried by the associated end support and engaged under spring action in a locking recess of the associated additional support, and the spring forces of both locking catches, the control edges of the additional support, and the ascending surfaces of the locking catch arranged on the carriage are so dimensioned and determined relative to one another, that the locking catch of the additional lock with the arrested abutment lock comes in engagement, the locking catch of the abutment lock after running of the additional support against the end support with the arrested additional lock is released for releasing the additional support movement.

Another simple construction can be provided when the additional lock is formed as at least one holding magnet and its holding force is dimensioned in the predetermined manner in relation to the holding force of the abutment lock.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is a schematic front view of a driving arrangement with a carriage in a central position between two end supports, in accordance with the present invention;

FIG. 2 is a plan view of the arrangement shown in FIG. 1;

FIG. 3 is a side view corresponding to the view of FIG. 1 with the carriage in its end position;

FIG. 4 is an increased sectioned partial view of a carriage end of the arrangement in accordance with the present invention with abutment of an arrested, additional support against an end support and a fixed carriage abutment;

FIG. 5 is a side view of the arrangement shown in FIG. 4 as seen from the left side;

FIG. 6 is a partial view corresponding to the view of FIG. 4 with arresting abutment of the additional support against the end supports, but with running the additional support against an abutment lock on the carriage prior to its overcoming; and FIG. 6a is a partial view substantially corresponding to the view of FIG. 6 but showing another embodiment of the additional lock formed as a holding magnet.

DESCRIPTION OF THE PREFERRED EMBODIMENTS

FIGS. 1–3 schematically show the principle of an arrangement in accordance with the present invention for driving a carriage movable in the X-direction on a coordinate table of a processing machine, wherein FIGS. 4 and 5 show respective parts of the arrangement.

From the coordinate table of the processing machine, only guide rail 1 is schematically shown. A driven carriage 2 slides on the guiding rail 1 for movement in X-direction or X-axis. The carriage 2 is formed relative to the Y-axis of the coordinate table or the processing machine as a cross carriage or cross slide. A ball screw drive is provided for driving the carriage 2. The ball screw drive includes a ball screw 3 and a ball screw nut 4. The ball screw 3 is supported at its ends by end supports 5 and 6 which are stationary relative to the carriage 2. At one end near the end support 6, the ball screw carries a drive means, for example a gear 7 which is connected with a not shown gear belt drive for rotatatively driving the ball screw 3. The ball screw nut 4 is arranged centrally on the carriage 2, as can be seen from FIGS. 1–3.

Additional or auxiliary supports 8 and 8' for the ball screw 3 are arranged on the carriage 2 at both sides of the spherical thread nut 4 each movable relative to the carriage 2 in its movement direction. In the respective outer end position of the displaceable additional support 8 and 8' its displacement stroke at the respective carriage end is limited by a fixed abutment 13 or 13', respectively. The additional supports 8 and 8', as well as their structural and functional parts shown in FIGS. 4–6, are arranged mirror-symmetrical relative to the ball screw nut 4 on the carriage 2, so that their functions in each movement direction of the carriage 2 are identical.

FIG. 3 illustrates the principle of operation of the arrangement in accordance with the present invention. The carriage or cross slide 2 with the ball screw nut 4 is shown in one of its extreme movement positions, here in its left position. In this position, the free length a of the ball screw 3 has its maximum value without consideration of the additional supports 8 and 8'. In accordance with the invention, this free length is limited to a value which prevents generation of the detrimental vibrations of the ball screw 3, and the ball screw is supported by the additional support 8 located at maximum distance from the ball screw nut 4. The initial free length a is thereby reduced in accordance with the invention to a considerably smaller free length b.

As is further shown in FIG. 3, the additional support 8' during movement in the end position shown in FIG. 3 is displaced by running against the end support 5 on the carriage 2 to the right in FIG. 3 toward the ball screw nut 4. As identified in FIG. 3 by a coordinate cross, the carriage 2 is displaced in the direction X−. A corresponding function in the mirror-symmetrical reverse takes place during movement of the carriage 2 in the opposite direction, or in the direction X+.

FIGS. 4–6 show further the construction of the arrangement in the region of the end support 5 and the additional support 8', as described hereinbelow. This showing and description are applicable in the mirror-symmetrical reverse also for the end support 6 and its associated additional support 8.

The additional supports 8 and 8' are formed as lunettes displaceable with the carriage and have a sleeve 9 which surrounds the ball screw 3 and is supported by a ball bearing 10 in the additional supports 8 or 8'. Each additional support 8, or the shown example 8', is provided at both its sides with guiding projections 11 and 11'. Each additional support 8 or 8' is guided on the carriage 2 in the X-direction with the aid of the guiding projections 11 and 11' and guiding rails 12 and 12' arranged on the carriage 2 complementary to the guiding projections 11 and 11'.

The essential construction of the arrangement and particularly of the respective locks can be better understood from FIGS. 4–6 in connection with the following description. When the carriage 2 displaces from its central position in accordance with FIGS. 1 and 2 in the direction X−, the additional support 8 is taken along with abutting against the fixed abutment 13. For entraining the additional support 8', an abutment lock is provided on the neighboring carriage surface and formed as a projecting locking catch 14 arranged under the action of a spring 17. During movement of the carriage 2 in the direction X−, the additional support 8' is arrested by the locking catch 14 and taken along. When the additional support 8' runs on the end support 5, the locking catch 14 is pressed back via its ascending surface 19a against the action of the spring 17 by an inclined control edge 15 of the additional support 8'. Thereby the arresting connection between the additional support 8' and the carriage 2 is released, and the carriage 2 can further displace in the predetermined position, whereas the additional support 8' is displaced from the end support 5 in the direction to the ball screw nut 4 until it assumes the end position shown in FIG. 3.

During running of the additional support 8' on the end support 5, the additional support is arrested by an additional lock on the end support, which is formed as a locking catch 16 carried by the associated end support, here the end support 5. The locking catch 16 is arranged under the action of a spring 18 and engages in a locking recess 16a on the upper side of the additional support 8'. Thereby a transitory arresting connection between the end support 5 and the auxiliary support 8' is established. This transitory connection or arresting is retained so long until the carriage 2 during a new positioning in the direction X+ releases via the fixed abutment 13' on the carriage 2 the additional support 8' from its arresting on the end support 5 and entrains the additional support 8'. FIG. 6 shows the position of the additional support 8' prior to its transfer in the abutting position on the fixed abutment 13', namely prior to the overcoming of the locking catch 14 against the action of the spring 17. When the carriage 2 moves from the position shown in FIG. 6 further in the direction X+ or in direction to the right in the drawing, the control edge 20 of the additional support 8' runs on the ascending surface 19 of the locking catch 14 and deflects the locking catch 14 against the action of the spring 17 downwardly. The additional support 8' remains arrested via the locking catch 16 and the locking recess 16a on the end support 5 so long until the additional support 8' abuts against the fixed abutment 13' and is arrested there by the locking catch 14, as shown in FIG. 4. During further movement of the carriage 2 in the direction X+, the locking catch 16 is overcome and the additional support 8' is released from its abutment on the end support 5 and taken along by the carriage 2.

For reliably attaining this operation, or in other words not separating the locking catch 14 of the additional support 8' from its arresting position on the end support 5, the holding forces, here the forces of the spring 17 of the locking catch 14 and the spring 18 of the locking catch 16, and the construction of the ascending surface 19 on the locking catch 14 as well as the control edges 15 and 20 on the additional support 8', are so determined relative to one another that, on the one hand, during movement of carriage 2 in direction X− the locking catch 14 acts harder and brings the additional support 8' to abutment on the end support 5, whereas on the other hand, during the return movement in direction X+ the locking catch 14 reacts so softly that the additional support 8' is not taken along from this locking catch 14, but only from the fixed abutment 13'.

The additional lock on the end support 5, and thereby the associated spring 18, are retained, as shown in FIGS. 4–6, with the aid of a suitable console-shaped holder 21 on the end support 5. As shown in FIG. 6a, instead of the locking catch 16 with the spring 18, two holding magnets 30 can be provided on the end support and cooperate with the facing surface of the additional support 8', as shown in FIG. 6a. Their holding force is dimensioned in the described manner in relation to the function of the locking catch 14 with the spring 17 and the associated control edges and ascending surfaces.

For the additional support 8 and the end support 6, structural elements which are mirror-symmetrical relative to the respective structural elements of the additional support 8' and the end support 5 are provided. They perform the same functions in mirror-symmetrically reversed manner.

Generally speaking, the inventive construction of the driving arrangement provides that, in all carriage positions via the additional support, such an additional support of the ball screw is obtained that the free lengths of the ball screw, which are responsible for the disadvantageous vibration effects, are always reduced.

It will be understood that each of the elements described above, or two or more together, may also find a useful application in other types of constructions differing from the types described above.

While the invention has been illustrated and described as embodied in an arrangement on a coordinate table of a processing machine for driving a carriage movable in X-direction, it is not intended to be limited to the details shown, since various modifications and structural changes may be made without departing in any way from the spirit of the present invention.

Without further anaysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. An arrangement on a coordinate table of a processing machine for driving a carriage (2) movable along an X-axis in two opposite directions, comprising displacing means having a ball screw nut carried by the carriage, and a ball screw cooperating with said ball screw nut and having two ends;

two end supports (5, 6) each provided at the respective end of said ball screw (3) and being stationary relative to the carriage (2);

two additional supports (8, 8') provided for said ball screw and arranged on the carriage at opposite sides of said nut and movable relative to the carriage in direction of its movement;

two stationary abutments (13, 13') each arranged at a respective one of the ends of the carriage and limiting a movement stroke of a respective one of said additional supports (8, 8') when the latter abut against the respective stationary abutment;

two releasable abutment locks (14) provided on said carriage and being operative so that each of the additional supports (8, 8') is locked with the carriage when a respective one of said additional supports abuts against a respective one of said stationary abutments (13, 13') or released from the carriage when, upon a further movement of the carriage, the respective one of the additional supports runs against the respective one of said end supports (5, 6); and two additional releasable locks (16) each arranged between each of said end supports (5, 6) and a respective one of the additional supports (8, 8') and being operative so that during a reverse movement of the carriage a respective one of the additional supports (8, 8') is coupled with the respective one of said end supports (5, 6) until the respective one of the additional supports again abuts against the respective one of the stationary abutments (13, 13') and is locked with the carriage.

2. An arrangement as defined in claim 1, wherein each of said additional supports is engageable with a respective abutment lock and a respective additional lock, and each additional releasable lock is arranged so that upon running a respective one of said additional supports against a respective one of said end supports it locks the respective end support and the respective additional support with one another, holding forces of each of said abutment locks and each of the respective additional locks being determined relative to one another so that each additional lock, comes into engagement with the respective additional support when the latter is engaged with the respective abutment, but each abutment lock becomes released from the respective additional support after running of the latter against the respective end support and when it is in engagement with the respective additional lock.

3. An arrangement as defined in claim 1, wherein the carriage has guiding rails, each of said additional supports being formed as a lunette movable with the carriage and having an end portion provided with two guiding projections which are movably guided in the guiding rails of the carriage.

4. An arrangement as defined in claim 1, wherein each of said additional supports has a front edge and a rear edge, each of said abutment locks including a locking catch deflectable by said front and rear edges against a springy actions.

5. An arrangement as defined in claim 4; and wherein each of said abutment locks further includes spring means arranged so that said locking catch is deflectable by said front and rear edges against the action of said spring means.

6. An arrangement as defined in claim 4, wherein each of said locking catches has ascending faces, said front and rear edges of each of said additional supports being formed as inclined control edges cooperating with said ascending faces of said locking catches.

7. An arrangement as defined in claim 6, wherein each of said additional locks is formed as a further locking catch carried by a respective one of said end supports, each of said additional supports having a locking recess in which a respective one of said further locking catches engages with a spring action, spring forces of both said first mentioned and further locking catches, said control edges of said additional supports and said ascending faces of said first mentioned locking catch being selected and determined relative to one another so that said further locking catch of said additional lock comes into engagement with the respective additional support when the latter is engaged with the respective abutment lock, but the locking catch of the respective abutment lock becomes released from the respective additional support after running of said additional support against the respective end support and when the respective additional lock is engaged with said respective additional support.

8. An arrangement as defined in claim 7; and further comprising further spring means arranged so that each of said further locking catches engages said locking recess of a respective one of said additional supports under the action of said further spring means.

9. An arrangement as defined in claim 1, wherein said additional locks are formed as holding magnets.

* * * * *